United States Patent [19]
Ergenbright et al.

[11] Patent Number: 6,129,205
[45] Date of Patent: Oct. 10, 2000

[54] VARIABLE LOOP COUNT CONVEYOR BELT

[75] Inventors: Erica D. Ergenbright, Centreville; Michael Etherington, Winchester, both of Va.

[73] Assignee: Ashworth Bros. Inc., Winchester, Va.

[21] Appl. No.: 09/207,601

[22] Filed: Dec. 9, 1998

[51] Int. Cl.⁷ .................................................. B65G 17/06
[52] U.S. Cl. .......................................... 198/852; 198/853
[58] Field of Search .................................... 198/852, 853, 198/778

[56] References Cited

U.S. PATENT DOCUMENTS

| | | |
|---|---|---|
| 4,078,655 | 3/1978 | Roinestad . |
| 4,276,980 | 7/1981 | Oizumi ..................................... 198/853 |
| 4,957,597 | 9/1990 | Irwin . |
| 5,139,135 | 8/1992 | Irwin et al. ............................. 198/852 |
| 5,141,099 | 8/1992 | Baumgartner . |
| 5,224,583 | 7/1993 | Palmaer et al. . |
| 5,271,491 | 12/1993 | Irwin . |
| 5,423,416 | 6/1995 | Kucharski . |
| 5,431,275 | 7/1995 | Faulkner . |
| 5,501,319 | 3/1996 | Larson et al. . |
| 5,558,208 | 9/1996 | Kucharski . |
| 5,590,755 | 1/1997 | Daringer et al. . |
| 5,622,252 | 4/1997 | Raum . |
| 5,906,270 | 5/1999 | Faulkner ................................ 198/853 |

FOREIGN PATENT DOCUMENTS

| | | |
|---|---|---|
| 9205096 | 4/1992 | WIPO . |

*Primary Examiner*—Jospeh E. Valenza
*Attorney, Agent, or Firm*—Nixon Peabody LLP; Jeffrey L. Costellia

[57] ABSTRACT

An improved conveyor belt is provided including an overlay element with a variable loop count over at least a portion of a transverse width of the belt, and preferably with a variable loop count from one side edge of the conveyor belt to the other side of the conveyor belt, thereby minimizing the frictional contact between the overlay elements and minimizing the excess loop density on the side of the belt defining the inner radius of the turn. The conveyor belt includes a plurality of overlay elements, each of the overlay elements including a plurality of linking bends, and a plurality of transverse rods extending laterally across the conveyor belt. Each of the overlay elements are positioned relative to one another such that their linking bends are intermeshed with linking bends of immediately adjacent overlay elements and the intermeshed linking bends receive one of the transverse rods thereby operatively connecting the adjacent overlay elements. The plurality of linking bends on each of the overlay elements are positioned in a successive manner, extending from the inside edge to the opposite side of the conveyor, so that the distance between successive linking bends is greater than the distance between prior successive linking bends. This design increases the durability of the conveyor belt and the reliability of the conveyor system and improves the performance of processing systems while reducing the cost of the belt.

31 Claims, 7 Drawing Sheets

VARIABLE LOOP COUNT CONVEYOR BELT

BACKGROUND OF THE INVENTION

1. Field of the Invention

The present invention relates to conveyor systems and conveyor belts. More specifically, the invention relates to an improved conveyor belt overlay element design for use in conveyor belts that effectively maneuver a curve or a turn and can be used in conveyor systems such as a turn conveyor and a spiral conveyor.

2. Description of Related Art

Conveyor systems are commonly used in various industrial fields for material handling and processing purposes. Many of these conveyor systems are used in harsh environmental conditions with space limitations and high capacity requirements. In such applications, wire conveyor belts are commonly used because of their durability and capacity. These wire conveyor belts are generally assembled from a plurality of overlay elements interlinked together which act to support objects being conveyed.

In one type of wire conveyor belt, the overlay elements are manufactured from wire spirals which are intermeshed and linked together by connecting rods extending transversely across the width of the conveyor belt. Connective links may be provided at the ends of the rods to serve as tractive links which may be driven by a motorized sprocket wheel for the operation of the conveyor belt. An example of such a wire conveyor belt with a wire mesh overlay made from wire spirals is shown in U.S. Pat. No. 4,957,597 to Irwin and U.S. Pat. No. 5,558,208 to Kucharski. As one skilled in the art will recognize, the loops formed by the wire spirals can be circular, elliptical, rectangular, triangular or any other geometrical shape when viewed transversely across the width of the conveyor belt. The selection of the shape of the wire spirals can be based on the objects to be supported and conveyed by the conveyor belt.

In another type of wire conveyor belt, the wire mesh is assembled from overlay elements formed from flat wires that are bent in a zig-zag manner to form a serrated shape. The flat wires are provided with holes or slots placed in various predetermined locations such that the flat wires can be intermeshed and linked together by connecting rods extending transversely across the width of the conveyor belt, much like the mesh overlays formed from wire spirals. An example of such wire conveyor belt with a wire mesh overlay made from flat wires is shown in U.S. Pat. No. 5,141,099 to Baumgartner and U.S. Pat. No. 5,501,319 to Larson et al. Again, one skilled in the art will recognize that the flat wires may be bent in other shapes such as a crank shape disclosed in U.S. Pat. No. 5,501,319 to Larson et al.

These wire conveyor belts have been designed to be partially collapsible in the lateral plane of the belt thereby allowing the belts to turn in a radial path. During a turn, the amount of overlap between the intermeshed overlay elements substantially increases at the inner radial side of the belt or alternatively, the intermeshed overlay elements may expand from an overlapped position at the outer radial side of the belt thereby allowing the wire conveyor belts to effectively maneuver a curve or a turn along the conveyor path. This allows such belts to be used in conveyor systems such as turn conveyors and spiral conveyors. For example, the Kucharski reference clearly shows a conveyor with wire spiral overlay elements where the outer radial side of the belt can expand from an overlapped position. The Baumgartner reference clearly shows a conveyor with intermeshed flat wire overlay elements that allow the conveyor belt to turn in a similar manner.

In utilizing these known belt designs, it has been found that because the amount of overlap between the intermeshed overlay elements substantially increases at the inner radial side of the belt, the overlay elements were frictionally contacting the adjacent, intermeshed overlay elements. This frictional contact causes the overlay elements to wear prematurely and reduces the durability of the belt. In addition, the frictional contact also causes the overlay elements to bind together causing jams in the conveyor system thereby reducing the reliability of the conveyor system.

It has also been found that in a conventional wire conveyor belt, the number of loops at the side of the belt defining the inner radius of the turn far exceeded the number of loops required to effectively support the objects being conveyed. This number of loops required is known as "loop density" and may be defined as the number of loops present in any given constant area on the conveyor belt. Generally in the art, the transverse rods of the wire conveyor belts support the objects being conveyed while the intermeshed overlay elements form the support surface of the belt which prevents the objects from falling between the transverse rods. The number of loops formed on the wire spiral is largely dependent upon the width of the belt and the size of the objects being conveyed. The smaller the object being conveyed, the greater the number of loops required (i.e. higher loop density) to prevent the objects from falling between the transverse rods. Thus, the loop density must be high enough to ensure that the objects being conveyed are fully supported and to ensure that the objects do not fall between the transverse rods. However, as noted in the previous discussion, in a conventional wire conveyor belt, the loop density increases dramatically during a turn at the side of the belt defining the inner radius of the turn because of the significant increase in the overlap between the loops. Thus, during a turn, excess loop density exists in conventional belts which is far above the loop density required to ensure that the objects being conveyed do not fall between the transverse rods.

In this regard, because the overlay elements are generally manufactured from heavy materials such as stainless steel, the excess loop density present in conventional belts also signify excess weight of the belt which decreases the durability of the belt. More specifically, the weight of the belt has been found to exert greater forces in welds and in associated structural members, such as tractive links, which are joined to the conveyor belt. This, of course, can cause these welds and associated structural members to fail, thereby decreasing the durability of the belt and the reliability of the conveyor system. Moreover, the heavy weight of the conventional belt diminishes the load capacity of the conveyor system. Since the conveyor drive system has a fixed load capacity, the total weight of the objects being conveyed is correspondingly limited by the heavy weight of the conveyor belt itself. Thus, if the weight of the belt can be effectively reduced, the total weight of the objects being conveyed can be increased by a corresponding amount. The heavy conveyor belt can also cause the conveyor drive system to be over worked which can cause the drive system to fail thereby reducing the reliability of the conveyor system.

Furthermore, the aforementioned excess loop density has been found to decrease the performance of various processing systems that utilize conventional conveyor belts. One example of such processing is in the food industry where convective heat transfer and/or fluids are used to process the food objects being conveyed. For instance, spiral conveyor systems are often used in refrigeration systems such that a food item enters the spiral conveyor and is blasted with cold air flowing through the wire mesh conveyor so that by the time it exits the spiral conveyor, the food item is frozen solid. It has been found that if a conventional, constant pitch wire conveyor belt is used, the increased loop density at the inner side of the belt interferes with the air flow to and around the food item thereby interfering with the effectiveness of the refrigeration system. This results in a non-uniform performance of the refrigeration system since the freezing of the food items is partially dependent upon the food item's position on the belt. Of course, although a specific example of the refrigeration system was discussed, this problem is similarly present in other food processing applications such as baking and cooking conveyor systems where convected heat is used to cook the food item being conveyed. Moreover, this non-uniformity problem exists in other processing applications which are used in a broad range of industries. For example, wash conveyor systems and chemical treatment conveyor systems experience similar non-uniformity problems because the flow of any liquid or gaseous medium through the conveyor belt is not constant across the width of the belt during a turn due to the increased loop density.

It has also been found that the size of the inner turning radius of the conveyor belt is partially limited by the design of the overlay elements. In the context of wire conveyor belts with wire spiral overlay elements, the size of the loops formed by the wire spirals have been found to limit the turning radius because the amount of overlap between the loops substantially increases during the turn. If the loops are large, they restrict the amount of overlap since the loops are at slightly different angles with respect to one another during the turn, thereby limiting the amount of overlap. In a similar manner, if the bends in the overlays formed by flat wires are made such that the bent portions are large, they can restrict the turning radius of the conveyor belt and cause binding if the radius is too small.

One approach to address the above minimum turn radius limitation is to use different overlay elements with different sized loops. According to this belt design, overlay elements with smaller sized loops are used on the side of the belt defining the inner radius of the turn and overlay elements with larger sized loops are used on the side of the belt defining the outer radius of the turn. This approach is exemplified in Baumgartner disclosing the use of two different overlay elements in the wire mesh overlay, each of the two overlay elements having different sized loops. Another approach is exemplified in U.S. Pat. No. 5,558,208 to Kucharski which discloses a conveyor belt design with a wire mesh overlay wherein the wire spirals are tapered so that the loops formed by the wire spirals are smaller toward the side of the conveyor belt defining the inner radius of the turn and the loops are progressively larger toward the side of the conveyor belt defining the outer radius of the turn. Such tapering of the wire spirals in the wire mesh overlay has been found to be effective in reducing the turning diameter of the conveyor belt.

While these wire conveyor belts are effective, especially in turn conveyor and spiral conveyor systems, the conventional overlay elements used in these conveyor belts still frictionally contact and rub against the adjacent overlay elements, especially at the side of belt defining the inner radius of the turn. As discussed previously, this frictional contact causes accelerated wearing and binding of these overlay elements which both decrease the durability of the belt and the reliability of the conveyor system. In addition, most of these designs still fail to effectively minimize the excess loop density and the resulting non-uniform performance of processing systems. Furthermore, new applications of compact conveyor systems have required conveyor belts with an even smaller turn radius which is not possible with the prior art belts.

Lastly, it has also been found that these wire conveyor belts are expensive to manufacture and operate. The materials used to manufacture the overlay elements, such as stainless steel, are very expensive and heavy. The heavy weight of a conventional belt diminishes the load capacity of the conveyor system and, as previously noted, exert greater forces on the various associated structural members of the conveyor belt. Consequently, the drive system operating a conventional wire mesh belt is required to have a higher drive capacity in order to operate with a predetermined load capacity. Furthermore, the conventional belts require various associated structural members of the conveyor belt and the conveyor system, such as the connective links, to be very robust in order for the belt to be durable. Of course, both of these requirements increase the cost of the conveyor system.

Therefore, there exists a need for a conveyor belt with an overlay element design that increases the durability of the belt and the reliability of the conveyor system while minimizing excess loop density and improving the performance of processing systems that utilize such a conveyor. There also exists a need for such a conveyor that decreases the minimum turn radius of the belt while minimizing the cost of the belt and the system requirements of the conveyor system.

SUMMARY OF THE INVENTION

In view of the foregoing, it is an object of the present invention to provide an improved conveyor belt including an overlay design that increases the durability of the belt while also increasing the reliability of the conveyor system.

A second object of the present invention is to provide an improved overlay design that minimizes frictional contact between the overlay elements of a wire mesh overlay when the belt is maneuvering around a turn.

A third object of the present invention is to provide an improved conveyor belt that minimizes excess loop density thereby improving the performance of various processing systems which utilize such a conveyor belt.

Another object of the present invention is to provide a conveyor belt with an improved overlay design that decreases the minimum turn radius of the belt.

Yet another object of the present invention is to provide an improved overlay design that minimizes material costs and system requirements of the conveyor belt and the conveyor system.

In accordance with preferred embodiments of the present invention, these objects are obtained by an improved conveyor belt including a plurality of overlay elements, each of the overlay elements including a plurality of linking bends, and a plurality of transverse rods extending laterally across the conveyor belt. Each of the overlay elements are positioned relative to one another such that their linking bends are intermeshed with linking bends of an immediately adjacent overlay elements and the intermeshed linking bends receives one of the transverse rods thereby operatively connecting the adjacent overlay elements. The plurality of linking bends on each of the overlay elements include a first linking bend, a second linking bend located transversely along each overlay element from the first linking bend, and a third linking bend located between and adjacent to the first linking bend and the second linking bend such that a first distance between the first linking bend and the third linking bend is greater than a second distance between the third linking bend and the second linking bend. In one embodiment, the overlay elements include a wire spiral with plurality of loops so that each of the overlay elements form a substantially helical shape extending across the conveyor belt. The loops may include gradual, radial bends defining the linking bends or alternatively, include at least one linear portion together with bends that define a linking bend. The wire spiral may also be tapered to form a conically shaped overlay element across the conveyor belt where each of the loops varies in size transversely across the conveyor.

In another embodiment of the present invention, each of the overlay elements include a flat wire with a plurality of bent corners that define the plurality of linking bends. The flat wire may form a serrated shape or a crank-like shape.

Yet in another embodiment, each of the overlay elements are formed from a synthetic, moldable material and formed with a plurality of intermeshing sections that define the linking bends. The overlay element made from the synthetic, moldable material may form a serrated shape or a crank-like shape or be made as modules having projections which define the linking bends.

These and other objects, features and advantages of the present invention will become more apparent from the following detailed description of the invention when viewed in conjunction with the accompanying drawings.

DETAILED DESCRIPTION OF THE PREFERRED EMBODIMENT

Figure 1:
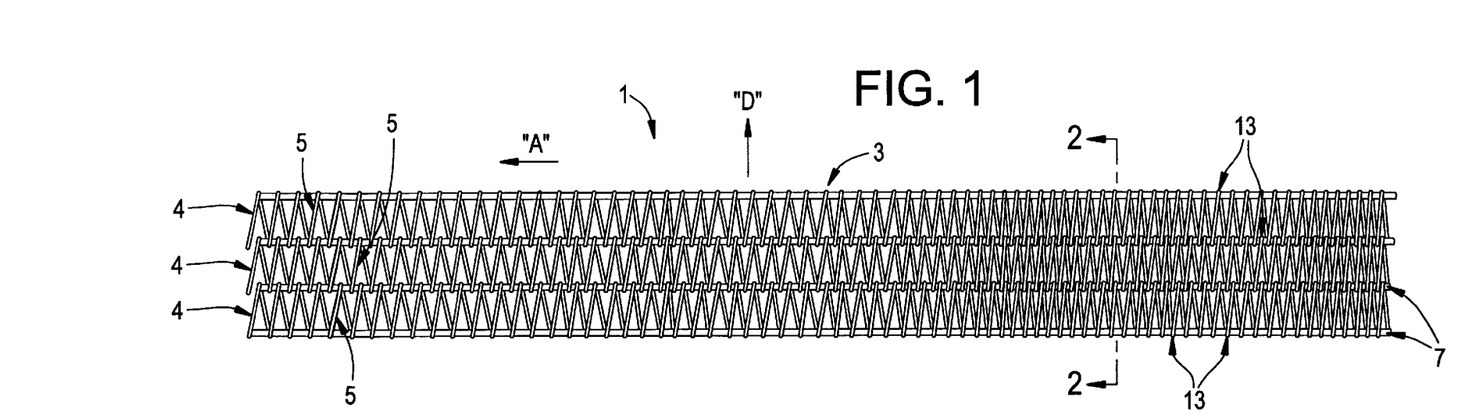
FIG. 1 is a top plan view of a segment of a conveyor belt including a wire mesh overlay in accordance with one embodiment of the present invention.

FIG. 1 illustrates a small segment of a wire conveyor belt 1 in accordance with one embodiment of the present invention including a wire mesh overlay 3 with a plurality of overlay elements 4. As discussed hereinbelow, the present invention increases the durability of the belt and the reliability of the conveyor system while minimizing the excess loop density during a turn thereby improving the performance of process systems utilizing the present invention. As also will be shown, the present invention decreases the minimum turn radius and reduces the costs of the belt and the conveyor system. Although the immediately following sections discuss wire overlay elements in accordance with the present invention, it is important to note that the present invention may also be easily applied to other conveyor belt designs including conveyor belts made from flat wires or from moldable materials including modules having rows of projections which are all known in the art. In this regard, the term "linking bends" is used in the general sense to mean the portion of the overlay element which intermesh with adjacent overlay elements as will be discussed below. Thus, the linking bends may be in the form of bent corners, intermeshing bends, projections, or different forms in the various alternative embodiments of the present invention.

In FIG. 1, the direction of travel of the wire conveyor belt 1 is indicated by the arrow "D" to provide reference and clarification of how the belt operates. Furthermore, the transverse direction of the segment of the wire conveyor belt 1 is indicated by the arrow "A" which also generally indicates the side of the conveyor belt 1 defining the inner radius of a turn as the conveyor maneuvers around a curve. As illustrated in FIG. 1, the overlay elements 4 laterally traverse the width of the wire conveyor belt 1. Each of the overlay elements include a plurality of linking bends 13 and are positioned relative to one another such that the linking bends 13 are intermeshed with the linking bends 13 of an immediately adjacent overlay element. The wire conveyor belt 1 also includes transverse rods 7 extending through the intermeshed linking bends thereby operatively connecting the adjacent overlay elements 4 in the manner shown. Of course, the transverse rods 7 are illustrated here as an example only and other means of operatively connecting the adjacent overlay elements may be used, depending on the conveyor belt design. For example, shorter sectioned rods, rivets, fasteners, molded retaining members, etc. may be used in the various overlay and conveyor belt designs.

Figure 2:
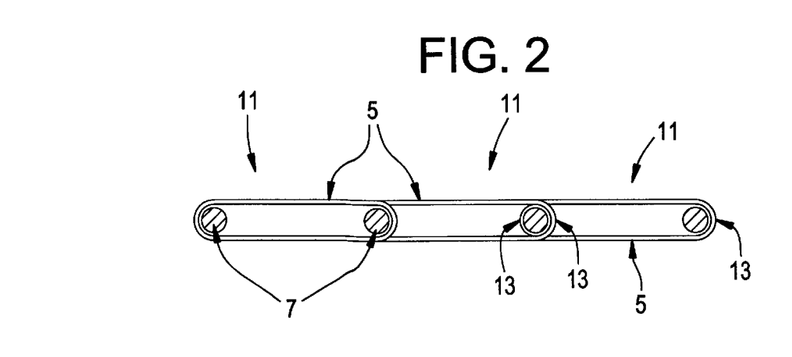
FIG. 2 is a cross sectional view of the conveyor belt of FIG. 1 as viewed from cross section "2—2" in accordance with one embodiment of the present invention with elliptical loops.

In the present embodiment of the invention, the overlay elements 4 are made from wire spirals 5 having a helical shape, as illustrated in FIG. 1. FIG. 2 is a cross sectional view of the conveyor belt 1 in FIG. 1, clearly showing that when the wire spirals 5 are viewed from a transverse direction across the width of the belt, the wire spirals 5 form loops 11 which are elliptical in shape. Each of the loops 11 of the wire spiral 5 includes linking bends generally indicated by numeral 13. As clearly illustrated, FIG. 2 also shows the intermeshing of the linking bends 13 with the linking bends of an adjacent wire spiral and the positioning of transverse rods 7. Although overlay elements 4 made from wire spirals 5 and having elliptical loops 11 are discussed herein as an example, other loop shapes and other overlay element designs may also be used in practicing the present invention.

Figure 3:
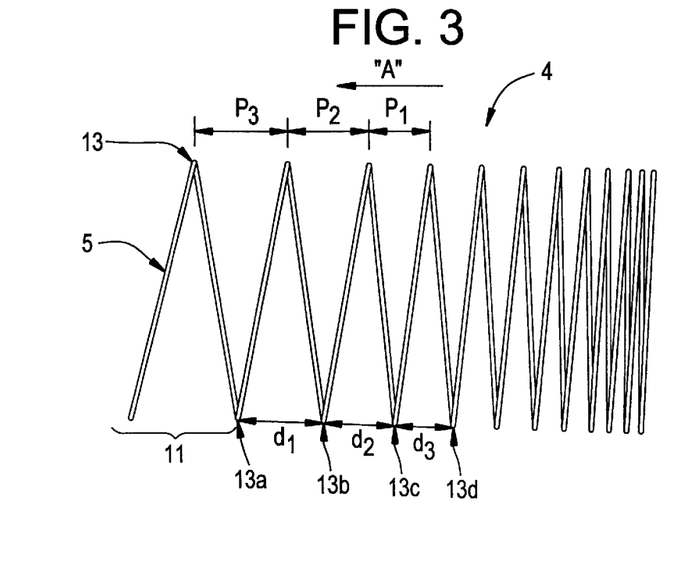
FIG. 3 is a simplified, enlarged plan view of one overlay element in accordance with the present invention.

An overlay element 4 in accordance with the present invention which is made from a wire spiral 5 is schematically illustrated with exaggerated features in FIG. 3. As indicated, the axial distance between each successive loop of the helix as measured between the linking bends is defined as the pitch, generally indicated as "P". As clearly shown in both FIGS. 1 and 3, the loops 11 of the wire spirals are spaced such that the pitch progressively increases in the transverse direction of arrow "A" which points to the side of the conveyor belt defining the inner radius of a turn through which the conveyor belt 1 maneuvers. Thus, more specifically, the pitch $P_3$ is greater that the pitch $P_2$ which in turn, is greater than the pitch $P_1$ as clearly shown. This progressively increasing pitch results in differing number of loops across the width of the belt 1. Consequently, the conveyor belt 1 can be descriptively referred to as a variable loop count conveyor belt. While the preferred embodiment illustrated in FIG. 1 shows the variable loop count extending the entire transverse width of the conveyor belt 1, the present invention may also be practiced to provide variable loop count on only a portion of the transverse width of the belt, e.g., an inner radial portion. For example, variable pitch may be provided on plurality of overlay elements only at a predetermined region of each overlay element such that when the plurality of overlay elements are operatively joined by the transverse rods to form the belt, variable loop count is provided on only a portion of the transverse width of the belt. For instance, the variable loop count may be provided on only ½, ⅓ or ¼ of the belt width, with the other portion of the belt width having constant loop count practiced in the prior art. Furthermore, the variable loop count may be provided on specific portions along the transverse width of the belt such that these specific portions of the belt width are provided with a lower loop density.

The present invention can be alternatively described in reference to specific linking bends as illustrated also in FIG. 3. Each overlay element 4 includes a plurality of linking bends, a first linking bend 13a, a second linking bend 13b, a third linking bend 13c, and a fourth linking bend 13d. As can be clearly seen, the third linking bend 13c is located transversely along the overlay element 4 from the first linking bend 13a. The second linking bend 13b is located between and adjacent to the first linking bend 13a and the third linking bend 13c. The second linking bend 13b is located such that the distance d, between the first linking bend 13a and the second linking bend 13b is greater than the distance $d_2$ between the second linking bend 13b and the third linking bend 13c. In a like manner, the fourth linking bend 13d is located transversely along the overlay element 4 from the second linking bend 13b. The third linking bend 13c is located between and adjacent to the second linking bend 13b and the fourth linking bend 13d such that the distance $d_2$ between the second linking bend 13b and the third linking bend 13c is greater than the distance $d_3$ between the third linking bend 13c and the fourth linking bend 13d. Of course, it should be recognized that the specific location of the above discussed linking bends 13a, 13b, 13c, and 13d are selected as an example only. In practicing the present invention, the practitioner in the art can apply similar analysis to any plurality of linking bends anywhere along the overlay element 4. Thus, it can be seen how the present invention provides a wire conveyor belt 1 with uniquely designed overlay elements 4.

Figure 4:
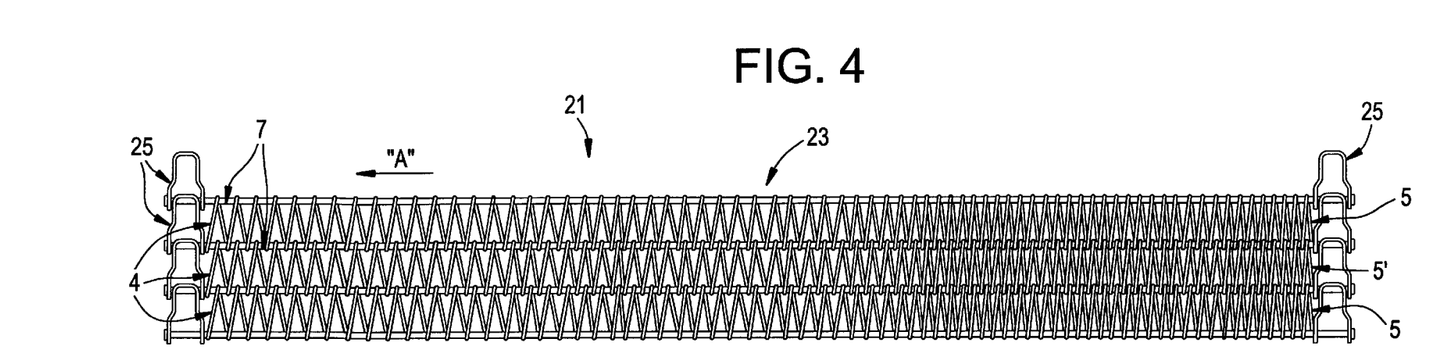
FIG. 4 is a top plan view of another conveyor belt in accordance with another embodiment of the present invention.

Another embodiment of the present invention is also illustrated in FIG. 4 showing a segment of a wire conveyor belt 21 with variable loop count where the pitch of each overlay element also progressively increases in the transverse direction of the arrow "A" as described previously. Common elements have been indicated using the same numerals as in the previous embodiment. The wire conveyor belt 21 includes a wire mesh overlay 23 with a plurality of interlinked overlay elements 4 made of wire spirals 5 and 5' which may be operatively connected by transverse rods 7. Connective links 25 are also provided at the ends of the rods to serve as tractive links which may be driven by a motorized sprocket wheel (not shown) for the operation of the conveyor belt 21. FIG. 4 also shows a "balanced weave" wire mesh design where each wire spiral is spiraled in an opposite direction of the adjacent spiral. This is illustrated by wire spiral 5' being spiraled in a clockwise direction along the arrow "A" which is in an opposite direction to the adjacent wire spirals 5 which are spiraled in a counter-clockwise direction along arrow "A". This embodiment operates in a similar manner to the embodiment discussed in FIGS. 1–3 discussed previously and also offers similar benefits which will be discussed in more detail below.

Figure 5:
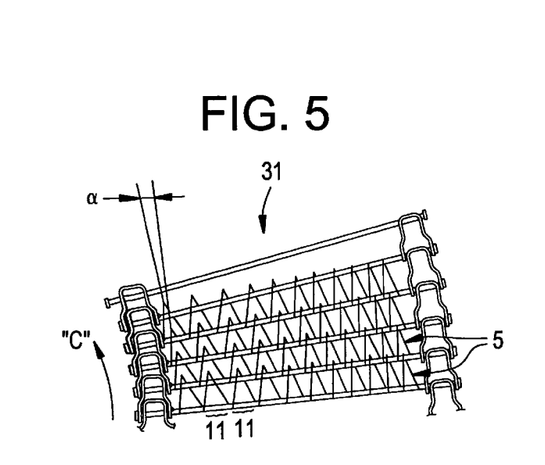
FIG. 5 is a simplified top plan view of a conveyor belt illustrated in FIG. 1, making a turn.

FIG. 5 provides a much simplified illustration of a segment of a wire conveyor belt 31 in accordance with the present invention in a radial turn in the direction of arrow "C" where the variable loop count extends the entire transverse width of the conveyor belt 31. However, as noted previously, the variable loop count of the present invention may also be practiced in only a portion of the transverse width of the conveyor belt 31. Generally, when a wire mesh type conveyor belt maneuvers around a turn, the amount of overlap between the intermeshed overlay elements substantially increase towards the side of the belt defining the inner radius of the turn and also causes the loops of the wire spirals to be at an angle with respect to the loops of an adjacent wire spiral. With conventional, constant pitch overlay elements, this increased amount of overlap and the angular difference in the position of the loops can cause the loops to frictionally contact the loops of an adjacent wire spiral as the conveyor belt maneuvers around a curve or turn along the conveyor path. This frictional contact causes the wire spirals to frictionally wear thereby accelerating the deterioration of the belt and reducing its durability. This frictional contact can also cause binding between the adjacent overlay elements which can lead to jamming of the conveyor system. However, in the present invention as shown in FIG. 5 in simplified form, the pitch of the loops 11 are progressively increased in the transverse direction on the side of the belt defining the inner radius of the turn. This permits a larger angular difference ax in the position of the loops 11 with respect to the loops of an adjacent wire spiral than would be possible with conventional, constant pitch overlay elements. This reduces the risk of frictional contact between the loops of adjacent wire spirals thereby improving the durability of the belt and the reliability of the conveyor system.

In addition, as shown in FIG. 5, the present invention minimizes the excess loop density of conventional belt designs since the wire spirals of the present belt have progressively increasing pitch toward the side of the belt defining the inner radius of the turn. Even with the progressively increasing pitch, the overlapping loops of a belt in accordance with the present invention is designed to provide sufficient loop density during the turn to prevent the objects being conveyed from falling between the transverse rods 7.

Furthermore, the present invention improves the performance of processing systems. More specifically, by reducing the loop density at the side of the conveyor belt defining the inner radius of the turn, a wire conveyor belt with progressively increasing pitch in accordance with the present invention minimizes the interference with the flow of a gaseous or liquid processing medium to and around the object being conveyed. This ensures a uniform performance of the processing system across the width of the belt during a turn or a curve. Also, because a conveyor belt in accordance with the present invention as shown in FIG. 5 allows a larger angular difference a. in the position of the loops 11 with respect to the loops of an adjacent wire spiral, the conveyor belt 31 can be designed to have a smaller turn radius than would be possible with conventional conveyor belts.

In addition, it has been found that a belt utilizing the progressive pitch of the present invention reduces the material cost and the weight of the belt as well as reducing the cost of the conveyor system. Because a belt in accordance with the present invention is designed to minimize the excess loop density, the material used in manufacturing the overlay elements is also minimized thereby reducing the weight and the material cost of the belt. Furthermore, because the weight of the belt can be reduced, the capacity requirements for the drive system operating the belt can also be reduced thereby reducing the cost of the conveyor system. Moreover, by reducing the weight of the belt, the strength requirements of the supporting structural members which support the conveyor belt can also be reduced thereby further reducing the cost of the conveyor system.

As previously noted, the present invention may also be easily applied to other conveyor belt designs including conveyor belts made from flat wires or from moldable materials. In addition, depending on the application, the variable pitch may be provided only at a predetermined region such that the variable loop count is provided on only a portion of the transverse width of the belt. For example, if the conveyor belt system is used in systems where the objects being conveyed need firm support but also higher air flow through the belt, the conveyor may be provided with higher loop density at the portion of the belt which will support the object and a variable loop count may be provided in the other portions of the belt to minimize air flow restriction. Such application is exemplified in the context of painted or stained furniture such as chairs and tables which have legs and are conveyed through a dryer. The conveyor belt may be designed in accordance with the present invention such that higher loop density is provided on portions of the conveyor belt which will support the legs while the other portions of the conveyor belt are provided with variable and lower loop densities to minimize air flow restriction to the furniture.

Figure 6:
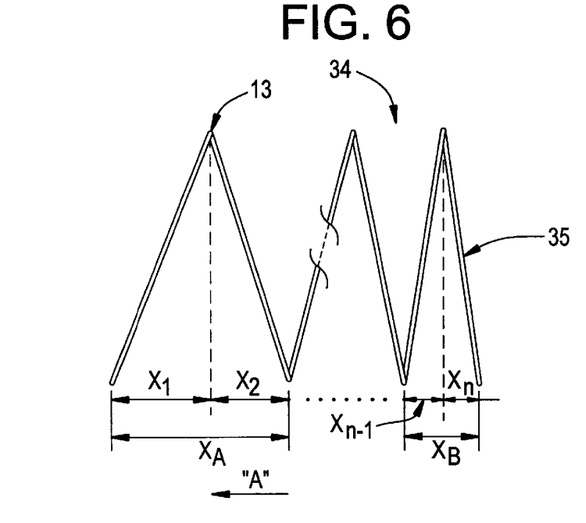
FIG. 6 is a plan view of one overlay element in accordance with the present invention with simplified and exaggerated features for analysis purposes.

The specific parameters of the variable pitch of an overlay element in accordance with the present invention may be empirically optimized through experimentation or be determined mathematically as described herein below. Of course, one must bear in mind that these parameters are also limited by other practical factors such as the size of the object being conveyed, ease of manufacturability, costs, etc. For the purpose of example only, FIG. 6 illustrates an overlay element 34 made from a wire spiral 35 in accordance with the present invention in an exaggerated, schematic form with progressively increasing pitch in the direction of arrow "A" across the whole width of the conveyor belt. As can be clearly seen, the variable pitch is illustrated by distance $X_A$ being greater than $X_B$. Because of the variable pitch, the distance $X_2$ which represents the distance laterally traversed in the direction of "A" by the portion of the loop before the linking bend 13 is generally smaller than the distance $X_1$ which represents the distance laterally traversed by the portion of the loop after the linking bend 13.

Again, as an example only, the distance $X_2$ can be related to the distance $X_1$ by some percentage factor Q where the relationship may be described by the mathematical expression:

$$X_2 = (Q)(X_1)$$

Of course, the percentage factor Q need not be a constant but can also be a mathematical function as well such as an exponential or logarithmic function. Again, as an example only, by applying mathematics, one useful method of determining the percentage factor has been found which can be described by the mathematical expression:

$$Q = \text{sqrt}[(W-X_A)/(W-X_B)]$$

where

W=desired belt width and sqrt=algebraic function "square root"

Furthermore, one useful method of determining the number of loops in the wire spiral which can be described by the mathematical expression:

$$n = \{\ln[(X_B/X_A)[(W-X_A)/(W-X_B)]]/\ln Q\}$$

where n=two times the number of loops in the wire spiral.

Lastly, it has also been found that the distance $X_1$ which represents the distance laterally traversed by the portion of the loop after the linking bend, may be determined by the mathematical expression:

$$X_1 = [X_A/(1+Q)]$$

Again, the above described mathematical relations are only examples of many possible relationships between the various parameters of the present invention and need not be followed in order to practice the present invention as claimed. As previously noted, other relationships between the parameters can be established or determined empirically or by applying mathematics.

It is readily apparent how all of the above discussed features of the present invention provide advantages superior to the conventional, constant pitch overlay designs. As discussed previously, the present invention increases the durability of the conveyor belt and the reliability of the conveyor system by reducing the frictional contact between the overlay elements thereby reducing the wear caused by such frictional contact. The present invention also minimizes excess loop density thereby improving the performance of process systems utilizing the present invention. In addition, the present invention minimizes the turn radius of the belt while reducing the cost of the belt and the conveyor system. As will be recognized by a person skilled in the art, these advantages of the present invention are particularly significant in applications such as turn conveyors and spiral conveyors which use long conveyor belts in a constant, radial turn. However, these benefits can also be realized in other conveyor applications including straight and turn conveyor belts.

Figure 7:
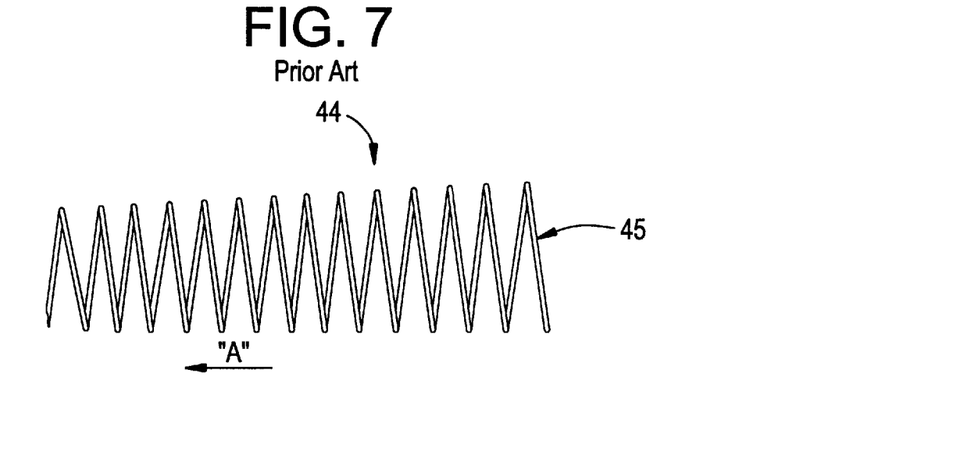
FIG. 7 is a plan view of one prior art overlay element which is tapered.
Figure 8:
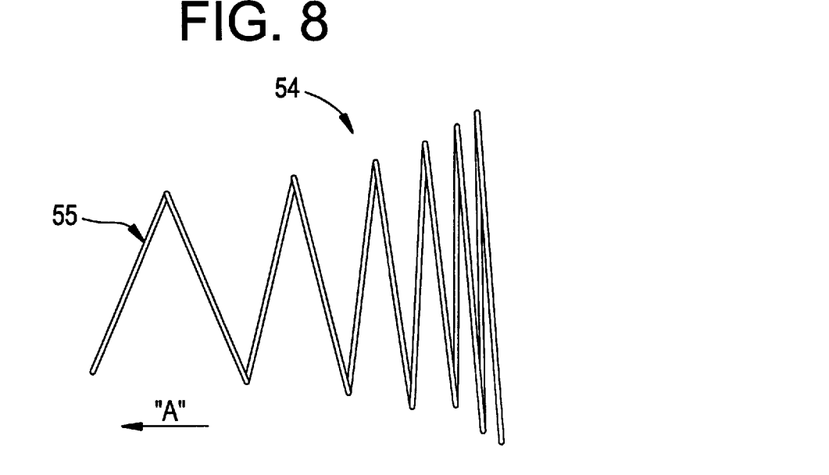
FIG. 8 is a plan view of a tapered overlay element in accordance with one embodiment of the present invention with simplified and exaggerated features.

In another embodiment of the present invention, the overlay elements may be modified to incorporate a taper by using progressively smaller sized loops toward the side of the conveyor belt defining the inner radius of the turn. A prior art overlay element 44 made from a wire spiral 45 is shown in FIG. 7 which illustrates how the overlay element may be gradually tapered in the direction of the arrow "A". It has been found that such tapering aids in reducing the minimum turn radius of the conveyor belt while reducing the use of materials used for the wire spirals. FIG. 8 shows an exaggerated and simplified overlay element 54 made from a wire spiral 55 in accordance with another embodiment of the present invention where the pitch progressively increases in the direction of arrow "A" and the wire spiral 55 is also gradually tapered in the same direction. This embodiment of the present invention can also be used to further minimize the turn radius of the belt and to further minimize the material used for the overlay element.

Figure 9:
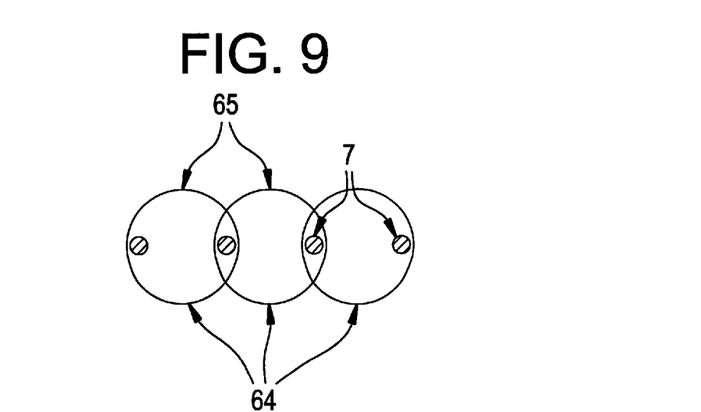
FIG. 9 is cross sectional view of another conveyor belt similar the conveyor belt of FIG. 1 as viewed from cross section "2—2" in accordance with another embodiment of the present invention with circular loops.
Figure 10A:
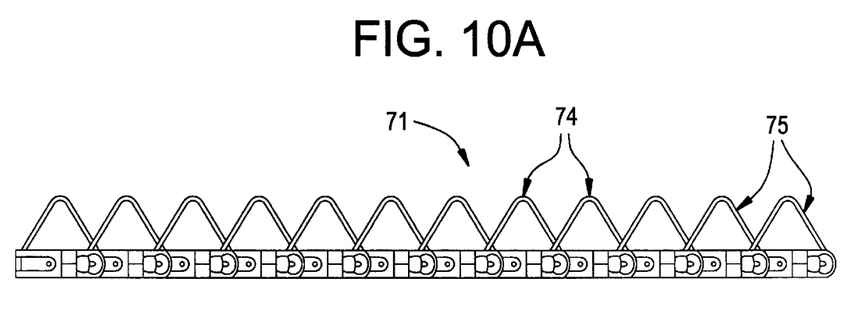
FIG. 10A is a side profile view of a wire conveyor belt including overlay elements with triangular shaped loops in accordance with another embodiment of the present invention.
Figure 10B:
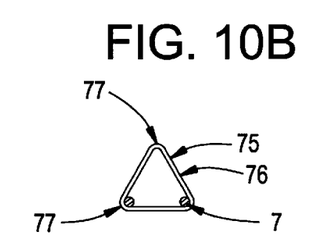
FIG. 10B is side profile view of an overlay element with a triangular shaped loops of FIG. 10A.
Figure 11A:
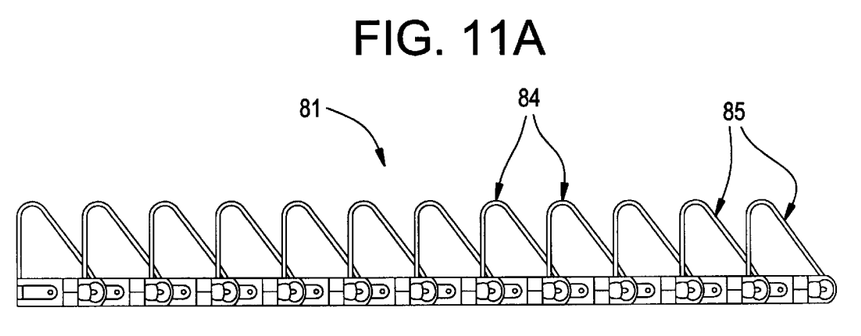
FIG. 11A is a side profile view of a wire conveyor belt including overlay elements with a different triangular shaped loops in accordance with another embodiment of the present invention.
Figure 11B:
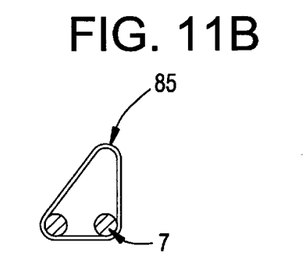
FIG. 11B is side profile view of an overlay element with a triangular shaped loops of FIG. 11A.
Figure 12A:
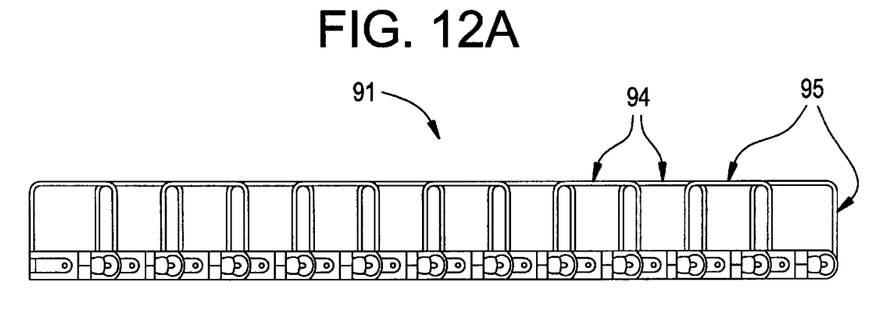
FIG. 12A is a side profile view of a wire conveyor belt including overlay elements with square shaped loops in accordance with another embodiment of the present invention.
Figure 12B:
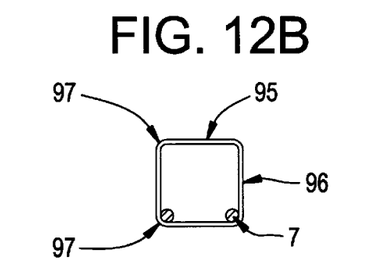
FIG. 12B is side profile view of an overlay element with a square shaped loops of FIG. 12A.
Figure 13:
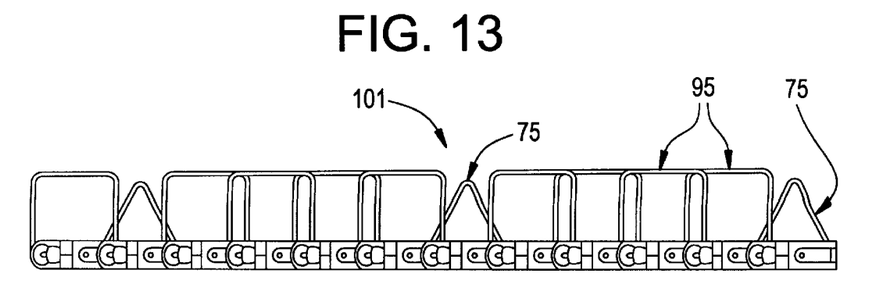
FIG. 13 is a side profile view of a wire conveyor belt including two different embodiments overlay elements with different shaped loops in accordance with another embodiment of the present invention.

It is also important to recognize that the present invention is not limited to application in wire overlay elements with elliptical loops discussed in the embodiments above. Overlay elements including wire spirals with many different loop shapes may be used and designed with a progressively increasing pitch in accordance with the present invention. For example, FIG. 9 illustrates an embodiment of the present invention wherein the overlay elements 64 form circular loops 65 and are operatively connected to adjacent overlay elements by transverse rods 7. The present invention may also be applied to overlay elements with loops including a straight portion and various numbers of angular bends such that each loop formed by the overlay element generally resembles a polygon. FIG. 10A shows a side profile view of a wire conveyor belt 71 including overlay elements 74 with triangular shaped loops 75 in accordance with another embodiment of the present invention while FIG. 10B more clearly shows the triangular shaped loops 75 including a straight portion 76 and angular bends 77. Similarly, FIG. 11A shows a side profile view of another wire conveyor belt 81 including overlay elements 84 with triangular shaped loops 85 in accordance with another embodiment of the present invention while FIG. 11B more clearly shows the triangular shaped loops 85 shown in FIG. 12A. FIG. 12A shows a side profile view of a wire conveyor belt 91 including overlay elements 94 with square shaped loops 95 in accordance with another embodiment of the present invention while FIG. 12B more clearly shows the square shaped loops 95 including a straight portion 96 and angular bends 97. Of course, the overlay elements may also be mixed within the belt as shown in a wire conveyor belt 101 in FIG. 13. In this embodiment, the wire conveyor belt 101 includes two different types of overlay elements, one with square shaped loops 95 and the other with triangular shaped loops 75. As can be appreciated from the examples above, overlay elements with numerous different loop shapes may be used in a wire conveyor belt in accordance with the present invention. All these overlay elements with different loop shapes can be adopted to incorporate the present invention where the pitch between the loops progressively increases toward the side of the belt defining the inner radius of the turn. In addition, all of these embodiments can be readily manufactured, for example, by using stainless steel spring wire and wire forming machines and techniques which are well known in the art.

Figure 14A:
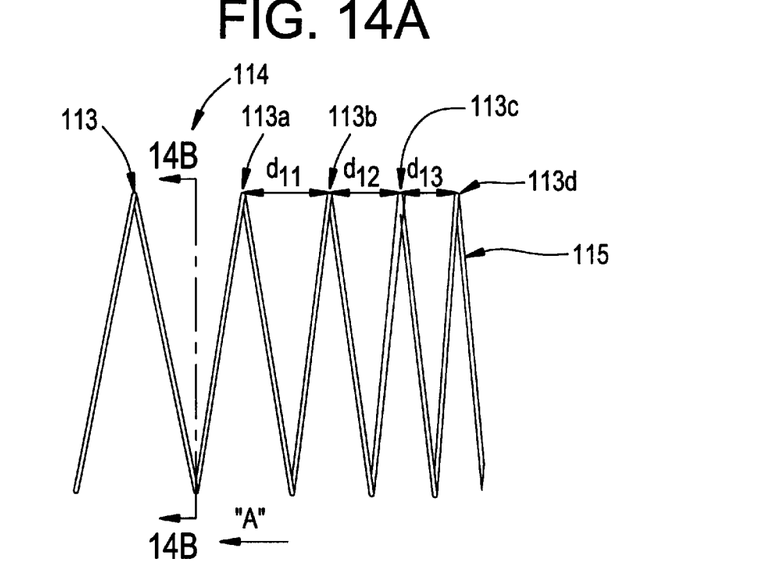
FIG. 14A is a top plan view of a flat wire overlay element generally having a serrated shape in accordance with another embodiment of the present invention.
Figure 14B:
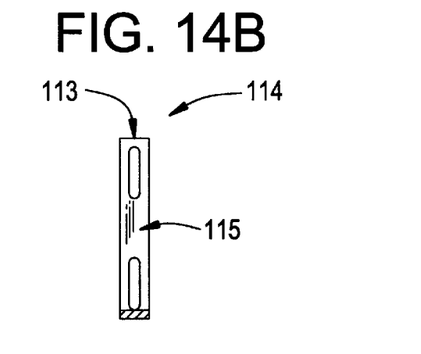
FIG. 14B is a cross sectional view of the flat wire overlay element of FIG. 14A as viewed from cross section "14B—14B".

Furthermore, the present invention can also be applied to different types of overlay elements presently known in the art such as those made from flat wires and molded synthetic materials. FIG. 14A illustrates an overlay element 114 made from a flat wire 115 in accordance with the present invention where the flat wire is bent in a successive fashion such that each overlay element 114 generally resembles a serrated shape with linking bends 113 where the distance between each successive linking bend increases in the general direction of arrow "A". As in the prior embodiments, each overlay element 114 includes a plurality of linking bends, a first linking bend 113a, a second linking bend 113b, a third linking bend 113c and a fourth linking bend 113d. As can be clearly seen, the third linking bend 113c is located transversely along the overlay element 114 from the first linking bend 113a. The second linking bend 113b is located between and adjacent to the first linking bend 113a and the third linking bend 113c such that the distance $d_{11}$ between the first linking bend 113a and the second linking bend 113b is greater than the distance $d_{12}$ between the second linking bend 113b and the third linking bend 113c. Again, in a like manner, the fourth linking bend 113d is located transversely along the overlay element 114 from the second linking bend 113b. The third linking bend 113c is located between and adjacent to the second linking bend 113b and the fourth linking bend 113d such that the distance $d_{12}$ between the second linking bend 113b and the third linking bend 113c is greater than the distance $d_{13}$ between the third linking bend 113c and the fourth linking bend 113d. Again, it should be recognized that the specific location of the above discussed linking bends 113a, 113b, 113c, and 113d are selected as an example only and the same analysis may be applied to any plurality of linking bends anywhere along the overlay element 114. FIG. 14B shows a cross sectional view of overlay element 114 of FIG. 14A as viewed from the cross section "14B—14B" clearly showing the flat wire 115.

Figure 15:
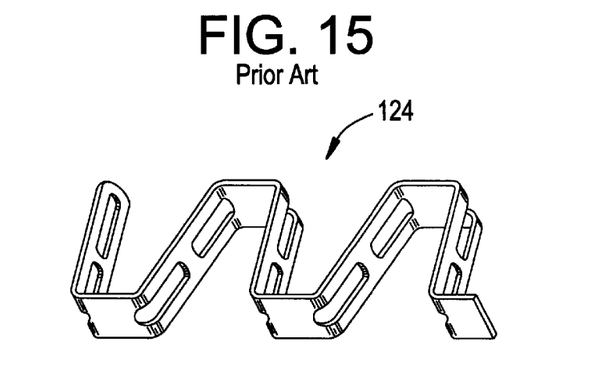
FIG. 15 is a perspective view of a prior art flat wire overlay element generally having a crank shape.
Figure 16:
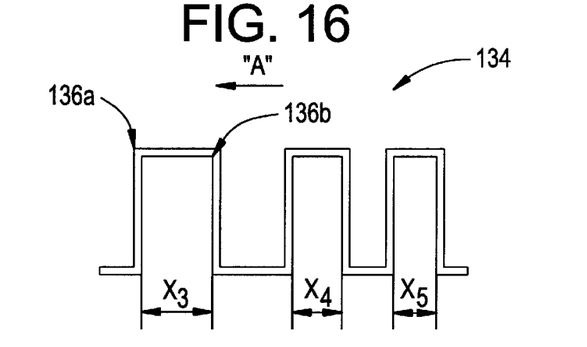
FIG. 16 is a top plan view of a flat wire overlay element generally having a crank shape in accordance with another embodiment of the present invention.

The flat wires may also be bent to generally resemble a crank shape such as the prior art overlay element 124 illustrated in FIG. 15. This overlay element can be modified in accordance with the present invention to an overlay element 134 having a crank shape as illustrated in FIG. 16 where the linking bends may be defined by the intermeshing sections including bends 136a and 136b. As clearly shown, each successive crank shaped portion in the direction of arrow "A", is transversely longer than a prior crank shaped portion such that the transverse distance $X_3$ is greater than the transverse distance $X_4$, which in turn, is greater than the transverse distance $X_5$.

Figures 17, 18:
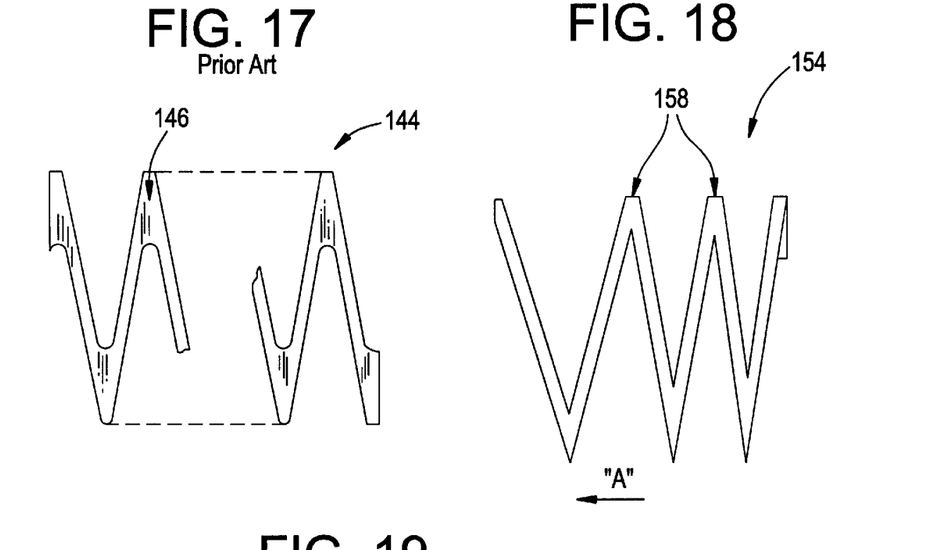
FIG. 17 is a perspective view of a prior art overlay element generally having a serrated shape which is manufactured from a molded synthetic material.
FIG. 18 is a top plan view of an overlay element manufactured from a synthetic material and generally having a serrated shape in accordance with another embodiment of the present invention.

FIG. 17 illustrates another prior art overlay element 144 which may be manufactured from a molded synthetic material such as plastic, nylon, composites, etc. These prior art overlay elements include intermeshing sections 146 which serve as the linking bends discussed previously and may also be easily designed in accordance with the present invention such that there is a progressive increase in the distance between the intermeshing sections. FIG. 18 illustrates an example of an overlay element 154 in accordance with the present invention where the overlay element 154 is manufactured from a molded synthetic material to generally resemble a serrated shape including intermeshing sections 158 where the distance between each successive adjacent intermeshing sections increases in the general direction of arrow "A".

Figure 19:
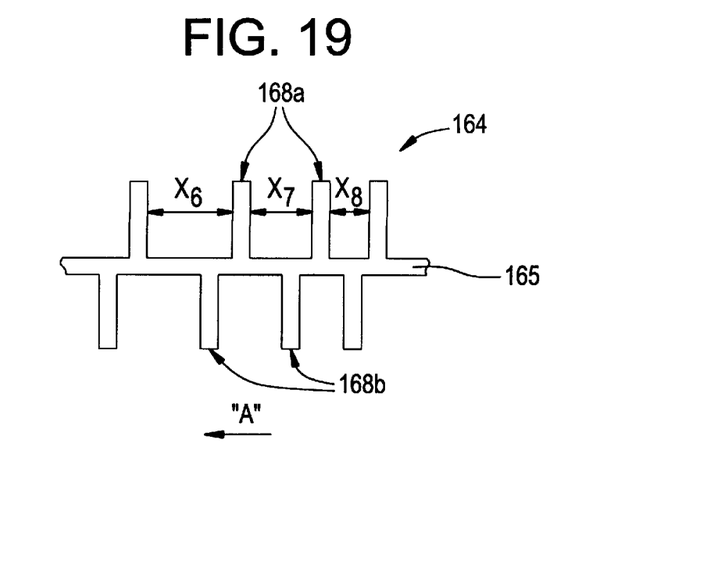
FIG. 19 is a top plan view of an overlay element in accordance with another embodiment of the present invention formed of molded modules including first and second rows of projections which define the linking bends.

FIG. 19 also illustrates another embodiment of the present invention including overlay element 164 made of molded modules 165 (only one illustrated) of the type disclosed in U.S. Pat. No. 5,224,583 to Palmaer et al. which may include a first row of projections 168a and second row of projections 168b that define the linking bends and intermesh with adjacent overlay elements (not shown). In accordance with the present invention, the distance between the projections progressively increase in the direction of arrow "A" such that the transverse distance $X_6$ is greater than the transverse distance $X_7$, which in turn, is greater than the transverse distance $X_8$.

All of the above disclosed alternative embodiments of the present invention as shown in the figures discussed above operate in a similar manner to the first embodiment discussed previously. Of course, many of the above disclosed embodiments of the present invention do not have "loops" per se, they do have intermeshing portions which, as previously noted, define the linking bends and may be in the form of bent corners, intermeshing bends, projections, or different forms in the various alternative embodiments. And in accordance with the present invention, the loop count, or the density of the linking bends, may be varied depending on the application of the conveyor belt. A particular embodiment may be selected by considering various factors which are already known and considered in the art such as the shape and the characteristics of the object to be conveyed and the processing application. Furthermore, as also noted previously, the present invention may also be practiced in only a portion of the transverse width of the conveyor belt. And like the first embodiment, all of the above alternative embodiments discussed also have similar advantages over conventional conveyor belts including improved durability and reduced costs.

From the foregoing discussion, it should now be apparent how the present invention provides an improved overlay element design for a conveyor belt with variable loop count or linking bend density across at least a portion of the conveyor belt. Furthermore, it can be seen how the present invention provides an overlay design that increases the durability of the belt, increases reliability of the conveyor system and minimizes excess density thereby improving the performance of process systems utilizing the present invention. In addition, it can be seen how the present invention minimizes the turn radius of the belt while reducing the cost of the belt and the conveyor system.

INDUSTRIAL APPLICABILITY

The present invention will find applicability in many types of conveyor belts and conveyor systems and will be especially applicable in conveyor systems that include curves or turns in the conveyor path such as turn and spiral conveyors.

We claim:

1. A conveyor belt comprising:

a plurality of overlay elements, each of said plurality of overlay elements including a plurality of linking bends including a first linking bend, a third linking bend located transversely along said each overlay element from said first linking bend, a second linking bend located between and adjacent to said first linking bend and said third linking bend such that a first distance between said first linking bend and said second linking bend is greater than a second distance between said second linking bend and said third linking bend, and a fourth linking bend located transversely along said each overlay element from said second linking bend, said third linking bend located between and adjacent to said second linking bend and said fourth linking bend such that said second distance between said second linking bend and said third linking bend is greater than a third distance between said third linking bend and said fourth linking bend, and each of said plurality of overlay elements are positioned relative to one another such that said plurality of linking bends are intermeshed with a plurality of linking bends of an immediately adjacent one of said plurality of overlay elements; and a connecting means for connecting said intermeshed linking bends of adjacent overlay elements thereby operatively connecting said adjacent overlay elements.

2. A conveyor belt of claim 1, wherein each of said plurality of overlay elements are formed from a continuous, helical wire spiral.

3. A conveyor belt of claim 1, wherein each of said plurality of overlay elements include a wire spiral with a plurality of loops thereby each of said plurality of overlay elements forming a substantially helical shape extending across said conveyor belt.

4. A conveyor belt of claim 3, wherein said plurality of loops includes gradual, radial bends defining said plurality of linking bends.

5. A conveyor belt of claim 3, wherein said plurality of loops includes at least one straight portion and an angular bend defining one of said plurality of linking bends.

6. A conveyor belt of claim 3, wherein said wire spiral is tapered to form a conically shaped overlay element across said conveyor belt, each of said plurality of loops varying in size transversely across said conveyor.

7. A conveyor belt of claim 1, wherein each of said plurality of overlay elements include a flat wire with a plurality of bent corners that define said plurality of linking bends.

8. A conveyor belt of claim 7, wherein said flat wire forms a serrated shape.

9. A conveyor belt of claim 7, wherein said flat wire forms a crank-like shape.

10. A conveyor belt of claim 1, wherein each of said plurality of overlay elements are formed from a synthetic, moldable material and formed with a plurality of intermeshing sections defining said linking bends.

11. A conveyor belt of claim 10, wherein said overlay element forms a serrated shape.

12. A conveyor belt of claim 10, wherein said overlay element forms a crank-like shape.

13. A conveyor belt of claim 10, wherein said overlay element is formed of molded modules with projections defining said intermeshing sections.

14. A conveyor belt of claim 1, wherein said connecting means includes a plurality of transverse rods extending laterally across said conveyor belt.

15. A conveyor belt of claim 1, wherein said plurality of bends includes successive groupings of said first, said second, said third and said fourth linking bends.

16. A conveyor belt comprising:
- a plurality of overlay elements, each of said plurality of overlay elements including an outside end, an inside end and a plurality of at least four linking bends positioned in succession across at least a portion of said conveyor belt between said outside end and said inside end, each of said successively positioned linking bends, extending in a direction from said inside end toward said outside end, being positioned a smaller spaced distance from an immediately prior linking bend than a spaced distance between said immediately prior linking bend and another prior linking bend, each of said plurality of overlay elements being arranged relative to one another such that said plurality of linking bends are intermeshed with linking bends of an immediately adjacent one of said plurality of overlay elements; and
- a plurality of transverse rods extending laterally across said conveyor belt;
- wherein said intermeshed linking bends of adjacent overlay elements receive one of said transverse rods thereby operatively connecting said adjacent overlay elements.

17. A conveyor belt of claim 16, wherein each of said plurality of overlay elements include a wire spiral with plurality of circular loops.

18. A conveyor belt of claim 16, wherein each of said plurality of overlay elements include a wire spiral with plurality of elliptical loops.

19. A conveyor belt of claim 16, wherein each of said plurality of overlay elements include a wire spiral with plurality of polygonal loops.

20. A conveyor belt of claim 16, wherein each of said plurality of overlay elements include a flat wire with plurality of angular bends thereby forming a serrated shape with a plurality of corners that define said linking bends.

21. A conveyor belt of claim 16, wherein each of said plurality of overlay elements include a flat wire with plurality of bends thereby forming a crank-like shape with a plurality of corners defining said linking bends.

22. A conveyor belt of claim 16, including tractive link fixedly attached to an end of one of said transverse rods.

23. A conveyor belt comprising:
- a plurality of overlay elements, each of said plurality of overlay elements including an outside end, an inside end and a plurality of at least four linking bends positioned in succession across at least a portion of said conveyor belt, each of said plurality of linking bends positioned from a first adjacent linking bend one of a lesser spaced distance and a greater spaced distance than an adjacent spaced distance from a second adjacent linking bend, each of said plurality of overlay elements being arranged relative to one another such that said plurality of linking bends are intermeshed with linking bends of an immediately adjacent one of said plurality of overlay elements; and
- a connecting means for connecting said intermeshed linking bends of adjacent overlay elements thereby operatively connecting said adjacent overlay elements.

24. A conveyor belt of claim 23, wherein each of said successively positioned linking bends across said at least a portion of said conveyor belt, extending in a general direction from said outside end toward said inside end, are positioned said greater spaced distance from a prior linking bend.

25. A conveyor belt of claim 23, wherein each of said plurality of overlay elements include a wire spiral with a plurality of loops, thereby each of said plurality of overlay elements forming a substantially helical shape extending across said conveyor belt.

26. A conveyor belt of claim 25, wherein said plurality of loops includes gradual, radial bends defining said plurality of linking bends.

27. A conveyor belt of claim 25, wherein said wire spiral is tapered to form a conical shape across said conveyor belt, each of said plurality of loops varying in size transversely across said conveyor.

28. A conveyor belt of claim 25, wherein said plurality of loops includes at least one straight portion and an angular bend defining one of said plurality of linking bends.

29. A conveyor belt of claim 23, wherein each of said plurality of overlay elements include a flat wire.

30. A conveyor belt of claim 23, wherein each of said plurality of overlay elements are formed from a synthetic, moldable material and formed with a plurality of intermeshing sections defining said linking bends.

31. A conveyor belt of claim 30, wherein said overlay element is formed of molded modules with projections defining said intermeshing sections.

* * * * *